Sept. 29, 1925.
F. L. MAIN
VEHICLE WHEEL
Filed Oct. 6, 1923
1,555,138
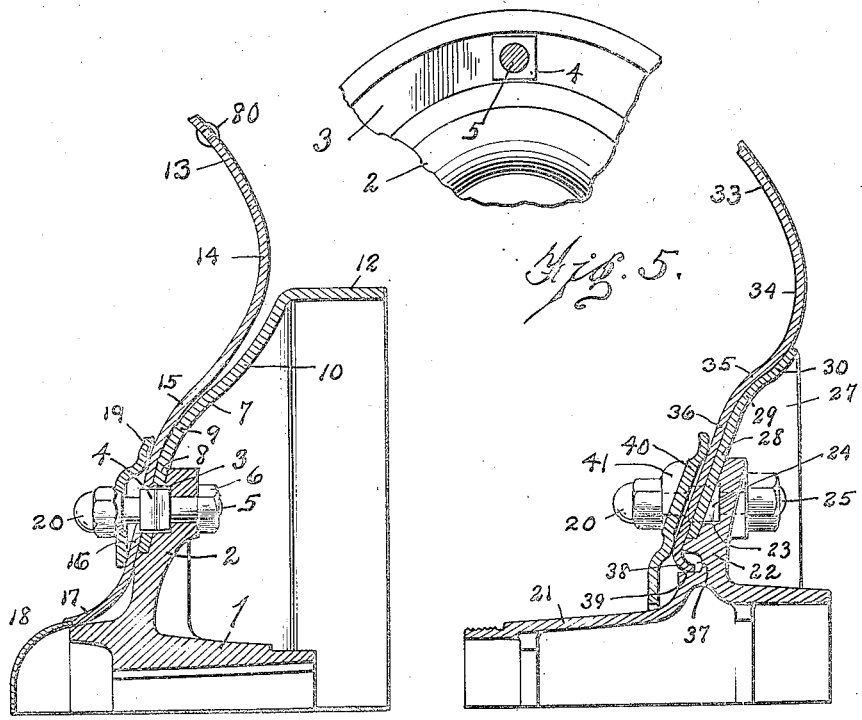
Fig. 5.
Fig. 1.
Fig. 2.
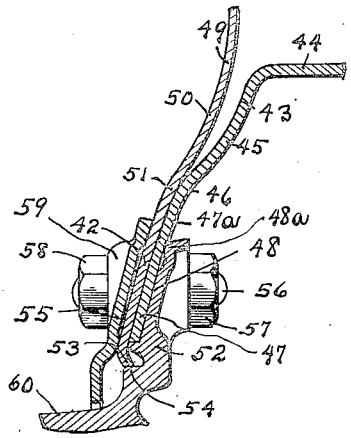
Fig. 3.
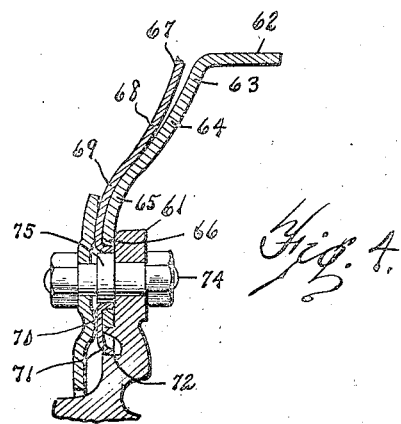
Fig. 4.
INVENTOR.
Frank L. Main
BY Edward N. Pagelsen
ATTORNEY.

Patented Sept. 29, 1925.

1,555,138

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

VEHICLE WHEEL.

Application filed October 6, 1923. Serial No. 666,904.

*To all whom it may concern:*

Be it known that I, FRANK L. MAIN, a citizen of the United States, and residing at Birmingham, in the county of Oakland and State of Michigan, have invented a new and Improved Vehicle Wheel, of which the following is a specification.

This invention relates to the construction of disc wheels for motor vehicles, particularly to the inner or central portion thereof, and its object is to provide a wheel wherein the central portion of the sheet metal disc shall be supported against axial distortion and in which the bolts which secure the disc to the hub shall be held from turning but shall be freely removable.

In the accompanying drawings, Figs. 1 to 4 inclusive are four radial axial sections of four embodiments of the present invention. Fig. 5 is an elevation of a segment of a hub flange.

Similar reference characters refer to like parts throughout the several views.

The hub 1 shown in Fig. 1 has a flange 2 which is formed with a groove 3 concentric with the axis of the hub and preferably substantially rectangular in cross section to receive the square central portion 4 of bolts 5 whose inner ends receive nuts 6. These bolts are kept from turning by the walls of the groove 3 but may be readily removed upon taking off the nuts 6.

The outer portion of the face of this flange is circumferentially recessed or turned down so that when the inner portion of the ring 7 is secured to the flange, its outer surface will be substantially a continuation of the surface of the flange, and that while that portion 8 of this ring 7 adjacent the bolts 5 is substantially conical, it is tangent to the curved portion 9 which merges into the oppositely curved portion 10 to constitute a reverse curve. In Fig. 1, the brake drum 12 attaches to the outer edge of this portion 10.

The disc 13 has an outwardly concave portion 14, an outwardly convex portion 15 which merges into the conical portion 16, and the central portion 17 which may rest on the outer end of the hub and engage or connect to the hub cap 18. A locking ring 19 engages the disc along circular lines on each side of the line of bolts 5, being pressed against the disc by the nuts 20.

The advantage of the peculiar curvatures of the disc and ring 7 is that when the disc 13 receives no more than normal axial stresses, it is supported only at the hub, but when the rim of the wheel is pressed inwardly, the disc bends so as to roll on the ring 10, contacting with and being braced by this ring at increasing distances from the hub as the axial stresses on the disc increase. The easy curves of the ring 7 prevent the disc from bending sharply along any line.

In Fig. 2 the hub 21 is shown provided with a flange 22 again formed with a groove 23 to receive bolts 25 having square portions 24 intermediate their ends. I do not wish to be limited to a groove of square cross section as any desired form of groove and of bolt may be employed so long as the bolt so fits the groove as to be prevented from rotating therein. The reinforcing or bracing ring 27 has a conical portion 28 fitting a set-back face of this hub, which portion 28 is tangent to the curved portion 29 which merges into the reversely curved outer portion 30.

The disc 33 is shown subject to axial stresses which cause it to fit the reinforcing ring 27, the reversely curved portions 34 and 35 and the conical portion 36 fitting the similar portions of the ring 27. The flange 22 is formed with a circular groove 37 to receive the inturned inner edge 38 of the disc which is centered by the inner wall 39 of this groove. A ring 40 engages the disc within and without the ring of bolts 25 but is somewhat wider than the ring 19 shown in Fig. 1. I prefer this ring to be formed with bosses 41 to furnish bearing surfaces for the nuts 20.

In Fig. 3 the hub flange 52 is again cut back to receive the inner edge of the ring 43 to which the brake drum 44 is attached, the reinforcing ring comprising the reversely curved portions 45 and 46 and the conical portions 47 and 47ª which fit the conical surfaces 48 and 48ª of the hub flange. The two conical surfaces 48 and 48ª are at slight angle to each other, the angle of the outer portion to the axis of the wheel being less than that of the inner. It will be noticed that the hub flange is formed with a groove where these two surfaces meet so that there will be no cramping of the reinforcing ring and of the disc at this point. The disc 49 again has an outwardly convex portion 50, an outwardly concave portion 51, a conical portion 42 fitting the portion 47 of the reinforcing ring, and an inwardly turned inner edge 53 fitting the shoulder 54 on the hub 60. A clamping ring 55 is secured in position by bolts 56 and nuts 57 and 58, being again formed with bosses 59 to receive the nuts 58.

In the structure shown in Fig. 4, the hub flange 61 has its bearing face in a plane at right angles to the axis of the wheel. The brake drum 62 is again shown connected to the reinforcing ring 63 which has the reversely curved portions 64 and 65 and the plane central portion 66 fitting the flange. The disc 67 is also formed with outwardly concave and convex portions 68 and 69, and with a plane central portion 70 whose inner edge 71 is curved to lie against a circumferential shoulder 72 on the flange.

The bolts 74 are formed with shoulders 75 of less size than the holes in the reinforcing ring and a circular flange is formed on the disc 67 at each bolt 74 to extend into the hole in the reinforcing ring to act as a bushing for the bolt. This structure is desirable for the driving wheels of motor vehicles as the flanges 76 and bolts 74 constitute an effective driving connection between the hub and disc.

It is to be observed that the use of the circular groove 3 in the hub flange is not limited to flanges with conical faces as this groove is of advantage in holding bolts from turning in practically every type of hub. It will be further observed that in each of the embodiments shown, the supporting plate, whether the rings 10, 43 or 64 of Figs. 1, 3 and 4, or the ring 27 of Fig. 2, contacts with the disc beyond the circumference of the hub flange. The radii of any supporting plate and of the disc in contact therewith are of but slightly different length so that these parts curve apart very gradually, which is of great importance as it insures rapidly increasing support for the disc as it is flexed transversely inwardly, which is the direction in which most of the emergency or accidental impacts occur. The contact between the discs and the supporting rings extends outside of the hub flange and the pressure of the locking ring is also outside the hub flange, so that it serves to place the disc and reinforcing plate under an initial tension which stiffens the structure at that distance from the axis.

When these structures are used for brake wheels, the brake drums will be formed or attached to the reinforcing rings and it will be noted that the brake drums serve as stiffeners for these reinforcing rings. The hub flanges are machined to receive the rings 7, 27, 43 or 63, and as these rings as well as the discs are pressed from sheet metal of even thickness no other machining is necessary, excepting the shoulders 39, 54 and 72 which center the discs. In the structure shown in Fig. 1 it is unnecessary to machine the front end of the hub as it is covered by the cap 18.

Many disc wheels vibrate at such rates while the vehicle is moving that quite loud and often very objectionable sounds are produced. I have found that small buttons 80 of lead in the form of rivets attached at intervals on such discs mute such sounds. The number of these buttons and their locations may vary with different types of wheels.

The details of construction and the proportions of the parts may all be changed by those skilled in the art without departing from the spirit of my invention as set forth in the following claims.

I claim:—

1. The combination with a flange on a wheel hub provided with a conical face formed with a circular groove having cylindrical walls and with bolt holes extending from the bottom of said groove, bolts mounted in said holes and having intermediate portions provided with parallel sides to contact with the sides of said groove, and a disc secured to said flange by said bolts.

2. The combination with a flange on a wheel hub provided with a conical face formed with a concentric groove and with bolt holes registering with the groove, bolts mounted in said holes and having intermediate portions fitting said groove and prevented from turning by the walls thereof, and a disc secured to said flange by said bolts.

3. The combination with a flange on a wheel hub provided with a conical face, a reinforcing ring fitting said face and having reversely curved concentric portions exterior of said flange, a disc fitting said conical portion of the ring and also provided with reversely curved portions adapted to engage the reversely curved portions of the ring when said disc is stressed axially, and means to secure the ring and disc to the hub flange.

4. The combination with a flange on a wheel hub, a reinforcing ring fitting said hub and having reversely curved portions exterior of the flange, a disc fitting against that portion of the ring which contacts with the hub flange and having reversely curved portions surrounding the same adapted to fit the reversely curved portions of said ring as the disc is stressed axially, and means to secure the disc and ring to the flange.

5. The combination with a flange on a wheel hub, a reinforcing ring fitting said hub and having reversely curved portions exterior of the flange, a disc fitting against that portion of the ring which contacts with the hub flange and having reversely curved portions surrounding the same adapted to fit the reversely curved portions of said ring as the disc is stressed axially, and means to secure the disc and ring to the flange, the engagement of the disc and ring increasing gradually outwardly from the axis of the wheel as the outward axial stress increases.

6. The combination with a hub flange formed with a concentric groove and with bolt holes registering with the groove, bolts mounted in said holes and having intermediate flattened portions fitting said groove and prevented from turning by the walls thereof, and a disc secured to said flange by said bolts.

7. A vehicle wheel disk and small bodies of inert metal secured thereto to interfere with the vibration of the disk.

FRANK L. MAIN.